United States Patent
Arai et al.

(10) Patent No.: US 7,113,661 B2
(45) Date of Patent: Sep. 26, 2006

(54) SEMICONDUCTOR DEVICE AND METHOD FOR MANUFACTURING THE SAME

(75) Inventors: Yasuyuki Arai, Atsugi (JP); Mai Akiba, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 126 days.

(21) Appl. No.: 10/793,787

(22) Filed: Mar. 8, 2004

(65) Prior Publication Data

US 2004/0179767 A1 Sep. 16, 2004

(30) Foreign Application Priority Data

Mar. 10, 2003 (JP) .............................. 2003-063349

(51) Int. Cl.
*G02B 6/12* (2006.01)
*H01L 21/00* (2006.01)

(52) U.S. Cl. ..................... 385/14; 385/129; 385/130; 385/131; 385/88; 385/92; 438/25; 438/26; 438/27; 438/28; 438/29; 438/31

(58) Field of Classification Search ............... 385/14, 385/129, 130, 131, 88, 92; 438/25, 26, 27, 438/28, 29, 31
See application file for complete search history.

(56) References Cited

U.S. PATENT DOCUMENTS

| | | | |
|---|---|---|---|
| 5,222,175 A * | 6/1993 | Tatoh | 385/93 |
| 5,627,364 A | 5/1997 | Codama et al. | 250/208.1 |
| 5,631,987 A * | 5/1997 | Lasky et al. | 385/88 |
| 5,774,614 A * | 6/1998 | Gilliland et al. | 385/88 |
| 5,818,990 A * | 10/1998 | Steijer et al. | 385/49 |
| 5,821,597 A | 10/1998 | Nakajima et al. | 257/458 |
| 6,019,523 A * | 2/2000 | Honmou | 385/94 |
| 6,265,772 B1 | 7/2001 | Yoshida | 257/712 |
| 6,312,304 B1 | 11/2001 | Duthaler et al. | 445/24 |
| 6,441,474 B1 | 8/2002 | Naitoh et al. | 257/676 |
| 6,486,071 B1 | 11/2002 | Ishikawa | 438/706 |
| 6,730,550 B1 | 5/2004 | Yamazaki et al. | 438/166 |
| 6,909,182 B1 | 6/2005 | Tatsumi et al. | 257/737 |
| 2004/0179767 A1* | 9/2004 | Arai et al. | 385/14 |

FOREIGN PATENT DOCUMENTS

| | | | | |
|---|---|---|---|---|
| JP | 2001-144027 | 5/2001 | | 385/14 X |
| JP | 2004-053539 | 2/2004 | | 385/14 X |

* cited by examiner

*Primary Examiner*—Brian M. Healy
(74) *Attorney, Agent, or Firm*—Eric J. Robinson; Robinson Intellectual Property Law Office, P.C.

(57) ABSTRACT

The present invention provides a semiconductor device using a support of new form which can further expand the range of design and enlarge a circuit size while restraining volume of a substrate than a flexible flat-plate substrate. A method for manufacturing a semiconductor device comprising the steps of: forming an insulating film on a fibrous support; forming a semiconductor film so as to be in contact with the insulating film; and forming a semiconductor device using the semiconductor film; wherein the step of forming the insulating film or the step of forming the semiconductor film is performed with the support rotating, using a rotational axis parallel to a longitudinal direction of the support as a center.

36 Claims, 8 Drawing Sheets

View Point A

View Point B

SEMICONDUCTOR DEVICE AND METHOD FOR MANUFACTURING THE SAME

This application is based on Japanese Patent Application No. 2003-063349 filed on Mar. 10, 2003, the contents of which are herein incorporated by reference.

BACKGROUND OF THE INVENTION

1. Field of the Invention

The present invention relates to a method for manufacturing a semiconductor device formed on a linear support and further relates to a semiconductor device formed by using the manufacturing method.

2. Description of the Related Art

As for a semiconductor device represented by an integrated circuit, a substrate having a poor flexibility such as a semiconductor substrate and a glass substrate is used conventionally. In recent years, a highly flexible substrate represented by a plastic substrate has been used, thereby expanding the range of design of electronics to be mounted with the semiconductor device. A flexible substrate serves many uses since the design is regarded as important particularly in the case of a semiconductor device mounted in a position attracting public attention. By using a substrate having a shape that is not provided by merely bending and twisting the flexible substrate, the range of the design of the electronics is considered to be further expanded.

As for the electronics, high functionality is regarded as important as well as design characteristics. A scale of an integrated circuit is required to be large to make the electronics have high functionality, but, if degree of integration does not change, the area of integrated circuit layout is required to be enlarged. Accordingly, a larger substrate is required to be used, and design characteristics of electronics to be mounted with the substrate might be lost.

SUMMARY OF THE INVENTION

It is an object of the present invention to provide a semiconductor device using a new type of a substrate (a support) which can further expand the range of design and enlarge a circuit size than a flexible flat-plate substrate while restraining volume of a substrate and a method for manufacturing the semiconductor device.

According to the present invention, a linear support (also referred to as a fiber) is used in place of a flat-plate substrate to be a support of an integrated circuit. Then, an integrated circuit is formed by using a semiconductor film formed on a surface of the fiber. In this specification, the fiber is a linear support comprising glass, plastic, metal, or the like, and a cross-section thereof is a circle, an ellipse, a rectangle, or has any other shape.

A semiconductor element used for the semiconductor device of the present invention includes every circuit device such as a thin film transistor (TFT), a storage device (memory), a diode, a photoelectric conversion device, a resistive device, a coil, a capacitor device, an inductor, and the like. The integrated circuit included in the semiconductor device of the present invention may include a microprocessor (CPU), a memory, a power supply circuit, other digital circuits, or other analog circuits.

The integrated circuit may be formed over a single fiber or a plurality of fibers. In the case of using the plurality of fibers, signals or power supply voltages are transmitted and received between the plurality of fibers by means of wirings, an optical transmission, or the like. When the signals or the power supply voltages are transmitted and received by the optical transmission with the use of an optical fiber as a fiber between fibers constituting the same semiconductor device or between the fiber and another semiconductor device, optical signals may be transmitted through the inside of the optical fiber. The inside of the fiber as well as a surface of the fiber can be utilized effectively for a structure of the integrated circuit by performing the optical transmission by the optical fiber.

The semiconductor device of the present invention also includes a display apparatus using the integrated circuit formed on the above-described fiber as a driving circuit. As the display apparatus included in the semiconductor device of the present invention, a liquid crystal display apparatus, a light-emitting apparatus including a light-emitting device in each pixel represented by an organic light-emitting device (electroluminescence device), a DMD (Digital Micromirror Device), or the like are typically cited.

According to the present invention, the range of design of electronics to be mounted with the semiconductor device can be more expanded by using the support having the above-described structure. Even if the area of an integrated circuit layout is enlarged, the volume of the support can be restrained by using the fiber as the support, since the fiber can secure a larger surface area than a flat-plate substrate having the same volume. Compared to the case of using the flat-plate substrate, the fiber can restrain the semiconductor device from being bulky as the function is more highly and from losing design characteristics of the electronics to be mounted with the semiconductor device. The surface area is enlarged by using the fiber, and an effect that heat of the integrated circuit can be radiated efficiently is also provided.

These and other objects, features and advantages of the present invention will become more apparent upon reading of the following detailed description along with the accompanied drawings.

DETAILED DESCRIPTION OF THE INVENTION

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

EMBODIMENT MODE 1

Figure 1A:
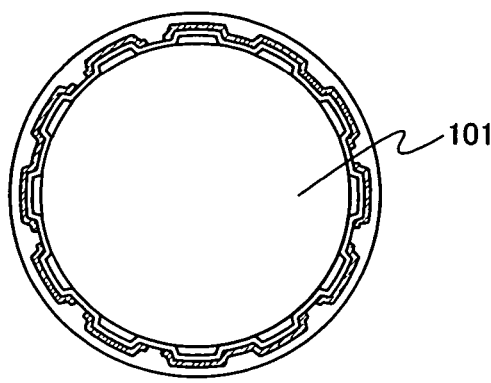
FIGS. 1A to 1C are cross-sectional views and a top view of a semiconductor element formed on a surface of a fiber.

FIG. 1A shows a cross-sectional view of a semiconductor device of the present invention. According to the present invention, an integrated circuit comprising a plurality of semiconductor elements is formed on a surface of a linear fiber 101. The fiber 101 can be made of glass, plastic, metal, or the like, and a cross-section thereof is a circle, an ellipse, a rectangle, or has any other shapes.

Figure 1B:
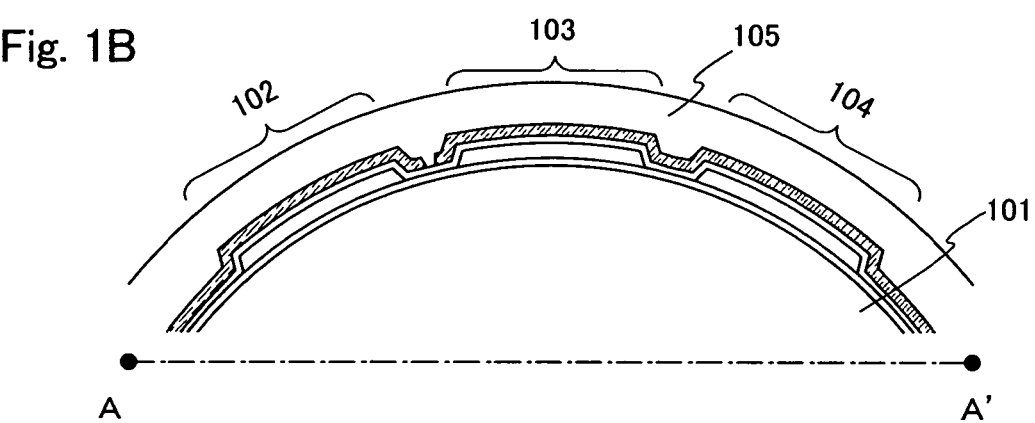
Figure 1C:
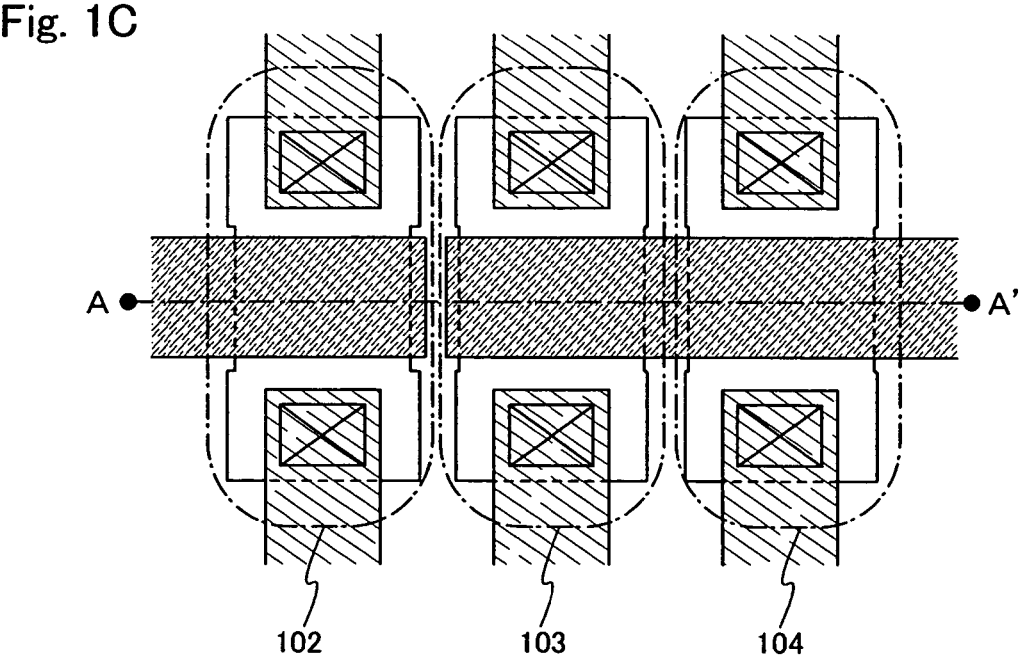

FIG. 1B corresponds to a diagram in which the cross-sectional view shown in FIG. 1A is enlarged partially. FIG. 1C is a diagram showing a portion of the fiber 101 seen from a surface, and a cross-sectional view along a line A–A' in FIG. 1C corresponds to FIG. 1B. FIG. 1B shows a cross-sectional view of TFTs 102 to 104 which are one of the semiconductor elements. The semiconductor elements represented by the TFTs 102 to 104 are formed on the surface of the fiber. The semiconductor elements represented by the TFTs 102 to 104 are electrically connected to one another by wirings formed over the surface of the fiber 101. In this embodiment mode, a protective film 105 is formed to protect the semiconductor elements by applying a resin to a periphery of the fiber 101 so as to cover the integrated circuit comprising these semiconductor elements, the wirings, and the like.

Subsequently, a method for manufacturing the semiconductor device of the present invention is described sequentially up to a step of forming an island semiconductor film used for the semiconductor element.

Figure 2A:
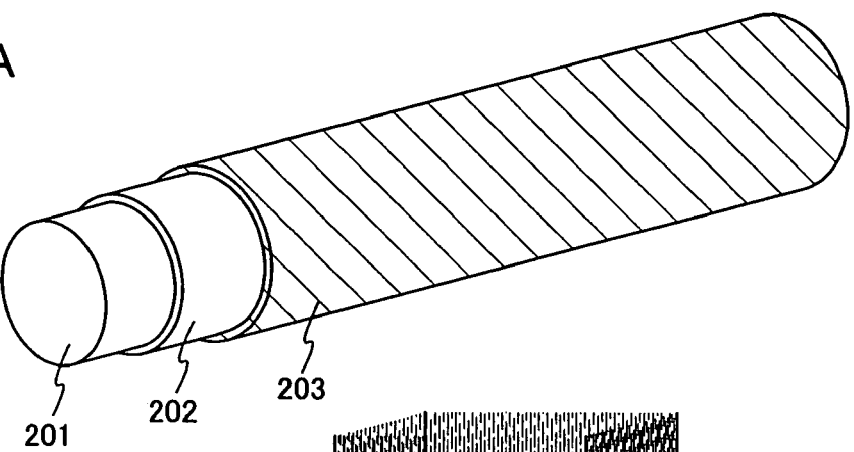
FIGS. 2A to 2C show a method for manufacturing a semiconductor element on a fiber surface.

First, as shown in FIG. 2A, an insulating film 202 is formed on a surface of a fiber 201. FIG. 2A shows each film in tiers to see the structure of laminated films easily. In this embodiment mode, a silicon oxynitride film is formed by plasma CVD (hereinafter, PCVD) to be approximately 100 nm in thickness. Note that the insulating film 202 is not limited to the silicon oxynitride film, and a silicon oxide film, a silicon nitride film, and other insulating films may be used. A method for forming the insulating film is not limited to PCVD, and other methods for forming films such as CVD including APCVD, LPCVD, and thermal CVD, sputtering, and the like can be applied.

Next, a semiconductor film 203 is formed to cover the insulating film 202 (FIG. 2A). In this embodiment mode, PCVD is adopted to form the semiconductor film 203; however, other CVD and sputtering can be adopted to form the film. The film thickness of the semiconductor film 203 is set to from 25 nm to 100 nm (preferably, from 30 nm to 60 nm). The semiconductor film 203 may be an amorphous semiconductor or a polycrystalline semiconductor. As for a semiconductor, silicon germanium as well as silicon can be used. When the silicon germanium is used, the concentration of germanium is preferably set to approximately from 0.01 atomic % to 4.5 atomic %.

Next, the semiconductor film 203 is crystallized by a known technique. As a known method for crystallization, there are a thermo-crystallization method using an electric heating furnace, a laser crystallization method using a laser light, and a lamp annealing crystallization method using an infrared ray. Alternatively, a crystallization method using a catalytic element may be conducted according to a technique described in Japanese Published Unexamined Patent Application No. Hei 07-130652. U.S. Pat. No. 5,643,826 issued to Ohtani et al. corresponds to this Japanese patent application. The entire disclosure of U.S. Pat. No. 5,643,826 is incorporated herein by reference. The semiconductor film 203 that is a polycrystalline semiconductor film is formed in advance by sputtering, PCVD, thermal CVD, and the like, and a step of crystallization may be omitted.

In this embodiment mode, the semiconductor film 203 is crystallized by the laser crystallization method. Crystals having a large grain size can be obtained by emitting a laser light of second, third or fourth harmonic of a fundamental wave with a solid-state laser that is capable of continuously oscillating. Typically, a second harmonic (wavelength: 532 nm) or a third harmonic (wavelength: 355 nm) of an Nd:YVO$_4$ laser (fundamental wave, wavelength: 1064 nm) is preferably applied. Specifically, a laser light emitted from continuous wave type YVO$_4$ laser is converted to the harmonic with a non-linear optical element to obtain a laser light with output power of 10 W. Further, there is a method of emitting the harmonic with the non-linear optical element. Preferably, the laser light is shaped to have a rectangular shape or an elliptical shape on a surface to be irradiated by using an optical system. The semiconductor film 203 is irradiated with the above-described laser light. On this occasion, an energy density approximately of from 0.01 MW/cm$^2$ to 100 MW/cm$^2$ (preferably from 0.1 MW/cm$^2$ to 10 MW/cm$^2$) is necessary. Scanning speed thereof is set to approximately from 10 cm/s to 2000 cm/s for emitting the laser light.

The laser crystallization may be performed with the use of laser light of pulsed oscillation, not limiting to the laser light of continuous wave.

Figure 2B:
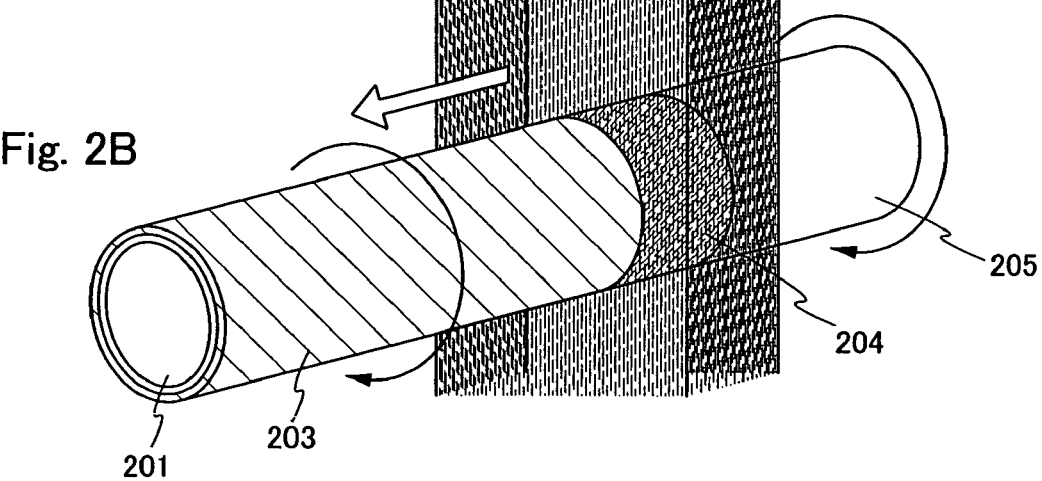

In order to irradiate an entire surface of the semiconductor film 203 with the laser light, using a parallel axis to a longitudinal direction of the fiber 201 as a rotational axis, the fiber 201 is rotated at the time of the laser light irradiation. The closer the rotational axis is to a center of the fiber 201, the more uniformly laser light can be emitted. FIG. 2B shows a state of crystallizing the semiconductor film 203 formed over the fiber 201 by the laser light. An arrow of a full line indicates a rotating direction of the fiber 201, and an outline arrow indicates a moving direction of a beam spot of the laser light. The moving direction of the beam spot preferably corresponds to the longitudinal direction of the fiber 201. With a move of the beam spot, a region 204 where the beam spot is overlapping with the semiconductor film 203 moves in the outline arrow direction. A semiconductor film 205 having increased crystallinity is formed by being irradiated with the laser light.

The laser light may be emitted in an inert gas atmosphere such as a rare gas or nitrogen. According to this, surface roughness of a semiconductor due to the laser light irradiation, further, variations of a threshold due to variations of interface state density can be prevented.

Figure 2C:
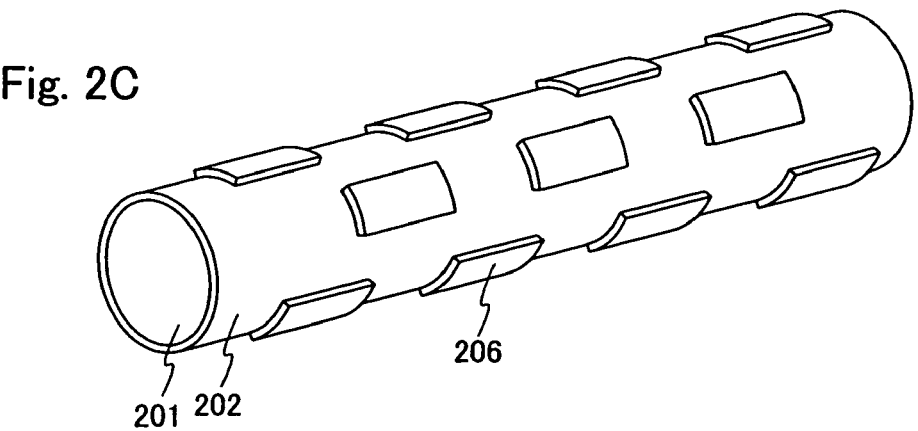

As shown in FIG. 2C, an island semiconductor film 206 is formed by patterning the semiconductor film having the increased crystallinity. Exposure at the time of forming a mask with resist can be performed by moving the exposure region sequentially in a longitudinal direction of the fiber 201. Using the parallel axis to the longitudinal direction as the rotational axis, the fiber 201 is rotated at the time of exposure so that a portion to be exposed is situated in a position where an optical image is built up in an exposure region. The closer the rotational axis is to the center of the fiber 201, the more uniformly the exposure can be performed.

With the use of the island semiconductor film 206 provided by means of the above-described manufacturing method, various semiconductor elements represented by a TFT can be formed. In this embodiment mode, the insulating film 202 is in contact with the island semiconductor film 206; however, depending on the semiconductor elements, electrodes or other insulating films may be formed between the insulating film 202 and the island semiconductor film 206. For example, in the case of a bottom gate type TFT which is one of the semiconductor elements, a gate electrode and a gate insulating film are formed between the insulating film 202 and the island semiconductor film 206.

As for a method for manufacturing a top gate type TFT, for example, after forming the island semiconductor film 206, various steps such as a step of forming a gate insulating film, a step of forming a gate electrode, a step of doping the island semiconductor film with impurities, and the like are provided. After the semiconductor element is formed, a step of forming a wiring to connect each semiconductor element electrically, and the like are provided. As in the above-described case of patterning the semiconductor film, exposure at the time of patterning performed after forming the island semiconductor film is performed with an exposure region moving in the longitudinal direction of the fiber and with the fiber rotating with the use of the parallel axis to the longitudinal direction of the fiber as the rotational axis so that a portion preferably to be exposed is situated in a position in an exposure region where an optical image is built up. The closer the rotational axis is to the center of the fiber, the more uniformly the exposure can be performed. A marker for determining a place to form a mask can be formed of the semiconductor film or the like.

In this embodiment mode, the fiber 201 is rotated during the laser light irradiation; however, at the time of the film formation of the insulating film, the semiconductor film, or other films, the fiber 201 may be rotated. The film thickness of the deposited film can be more uniform by rotating the fiber 201 at the time of the film formation. In the case of a method for forming film, particularly such as the sputtering, of which step coverage is poorer than CVD or the like, it is effective to rotate the fiber 201 at the time of forming a film.

By forming the semiconductor element to be laminated and making the integrated circuit three dimensional, the layout area of the integrated circuit can be restrained as well as enlarging a circuit size.

After forming the semiconductor element, the wiring to connect the semiconductor elements electrically, and the like, the surface may be covered by forming the protective film with a resin and the like to protect the semiconductor element, the wiring, and the like. A terminal for transmitting and receiving signals or power supply voltages to/from the integrated circuit formed on the fiber 201 is exposed without being covered with the protective film. When all the signals or the power supply voltages are transmitted and received to/from the integrated circuit by optical transmission, a light-emitting device or a photodetector is provided in place of the terminal. In this case, the light-emitting device or the photodetector is not necessarily exposed and may be covered with transparent resin or the like.

According to the above-described structure, the present invention can expand the range of design of the electronics to be mounted with the semiconductor device. And even if the area of an integrated circuit layout is enlarged, volume of a support can be restrained by using the fiber as the support, since the fiber can secure larger surface area than a flat-plate substrate having the same volume. Compared to the case of using the flat-plate substrate, the fiber restrains the semiconductor device from being bulky as the function is more highly and from losing design characteristics of the electronics to be mounted with the semiconductor device. The surface area is enlarged by using the fiber, and an effect that heat of the integrated circuit can be radiated efficiently is also provided.

EMBODIMENT MODE 2

In this embodiment mode, a method for irradiating with laser light during a step of manufacturing a semiconductor device of the present invention is described specifically.

Figure 3A:
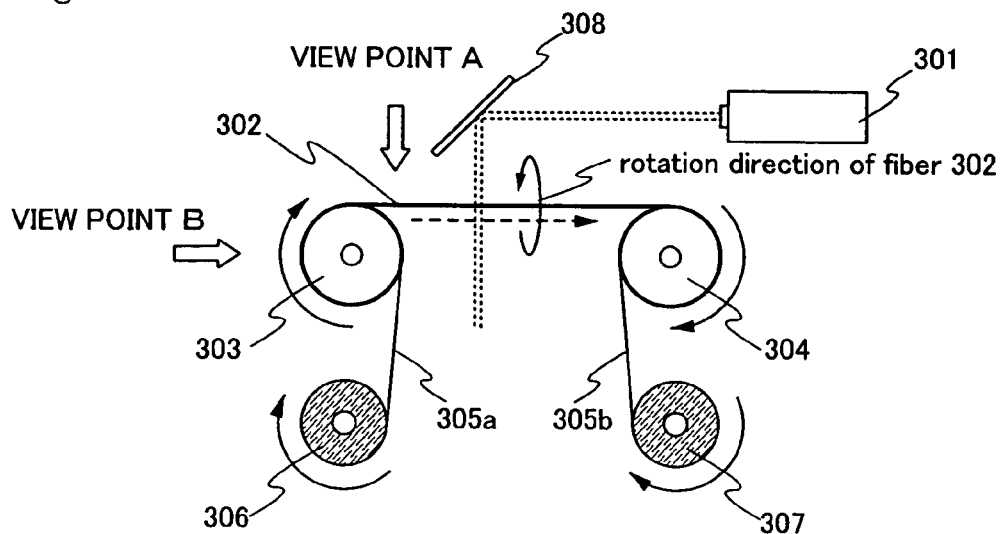
FIGS. 3A to 3C show a method for irradiating a fiber with laser light.
Figure 3B:
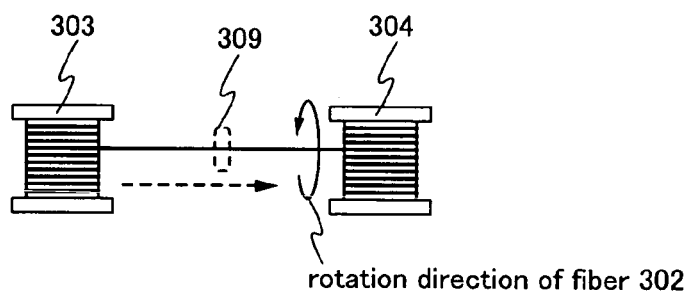
Figure 3C:
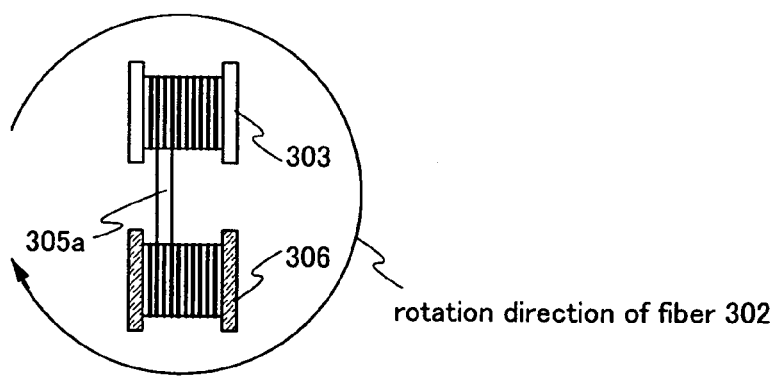

FIG. 3A shows positions of a laser oscillator 301, reels 303 and 304 for a fiber 302, and reels 306 and 307 for tapes 305a and 305b to protect the wound fiber 302. FIG. 3B shows positions of the reels 303 and 304 seen from a viewpoint A indicated by an arrow in FIG. 3A, and FIG. 3C shows positions of the reels 303 and 306 seen from a viewpoint B indicated by an arrow in FIG. 3A.

At the time of laser light irradiation, the fiber 302 moves in a direction of an arrow of a broken line and is wound around the reel 304 from the reel 303 by spinning the reels 303 and 304 in synchronization. Laser light oscillated from the laser oscillator 301 is emitted to a portion of the fiber 302 located between the reels 303 and 304 by adjusting the light path by means of an optical system 308. A region 309 indicated by a broken line in FIG. 3B corresponds to a beam spot of the laser light.

When the fiber 302 is wound around the reels 303 and 304, the tapes (protective tape) 305a and 305b for protecting a surface are preferably wound around each of the reels 303 and 304 together with the fiber 302 to prevent a surface of the fiber 302 from being rubbed to be damaged. By spinning the reel 303 for the fiber 302 and the reel 306 for the protective tape 305a in synchronization, the protective tape 305a wound around the reel 303 together with the fiber 302 is wound around the reel 306 at the time of winding the fiber 302 around the reel 306 from the reel 303. Similarly, by spinning the reel 304 for the fiber 302 and the reel 307 for the protective tape 305b in synchronization, the protective tape 305b wound around the reel 307 is wound around the reel 304 together with the fiber 302 at the time of winding the fiber 302 around the reel 304.

At the time of the laser light irradiation, the fiber 302 is rotated as shown by an arrow of a full line, using a parallel axis to a longitudinal direction of the fiber 302 as a rotational axis. The closer the rotation axis is to a center of the fiber 302, the more uniformly the laser light can be irradiated with. Specifically, the fiber 302 is rotated by revolving all the reels 303, 304, 306, and 307 as a whole. The revolution of all the reels 303, 304, 306, and 307 as a whole is synchronized to have the same speed and direction as the fiber 302 so as not to twist the fiber 302.

According to the above-described structure, the entire fiber 302 can be irradiated with the laser light.

In the case of a flat-plate substrate, there is a problem that the substrate is difficult to transport since the substrate bends due to its weight when a size of the substrate is enlarged along with enlargement of a circuit size of an integrated circuit. According to the present invention, in a process of manufacturing a semiconductor device, the substrate can be transported with the fiber wound around the reel between manufacturing apparatuses. Therefore, efficiency in transporting the substrate can be raised without being difficult to transport the substrate due to bending according to the enlargement of the circuit size.

EMBODIMENT 1

In this embodiment, a structure of a sputtering apparatus used in a step of manufacturing a semiconductor device of the present invention is described.

Figure 4:
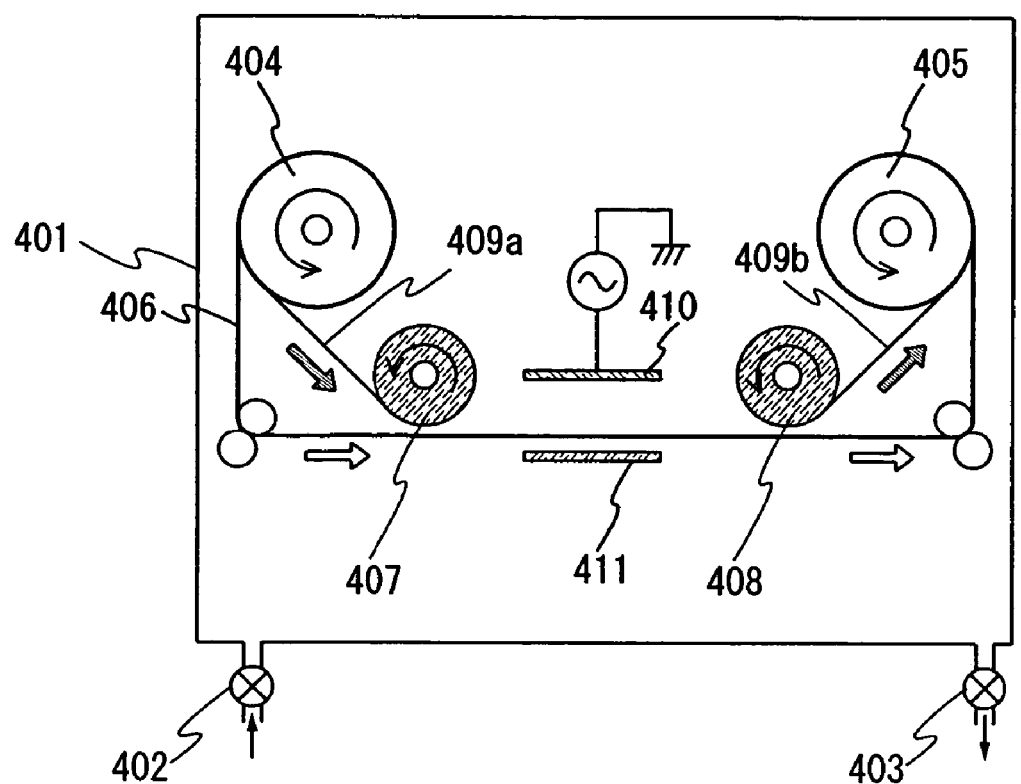
FIG. 4 is a cross-sectional view of a sputtering apparatus for forming a film on a fiber.

FIG. 4 is a cross-sectional view of a sputtering apparatus of this embodiment. Reference numeral 401 denotes a sputtering chamber, and the chamber 401 comprises a gas supplier 402 to the chamber 401 and an exhauster 403 for the chamber 401. Reference numerals 404 and 405 denote reels for a fiber 406, and the fiber 406 can be moved by spinning the reels 404 and 405 in synchronization. Reference numerals 407 and 408 denote reels for protective tapes 409*a* and 409*b*. The chamber 401 also comprises an applied electrode 410 having a target and a heater 411 serving also as an electrode.

For example, in the case of forming a silicon nitride film, argon of 10 sccm, nitrogen of 35 sccm, and hydrogen of 5 sccm are supplied by means of the gas supplier 402, and an atmosphere inside the chamber 401 is maintained at 0.4 Pa by the exhauster 403 such as a turbo-molecular pump. In case of forming a silicon nitride oxide film, argon of 10 sccm, nitrogen of 31 sccm, hydrogen of 5 sccm, and $N_2O$ of 4 sccm are supplied by means of the gas supplier 402, and the atmosphere inside the chamber 401 is maintained at 0.4 Pa by the exhauster 403 such as the turbo-molecular pump.

All the reels 404, 405, 409*a*, and 409*b* are revolved as a whole so that a film formed by sputtering is formed uniformly on the fiber 406, and thus the fiber 406 is rotated. The fiber 406 with the film formed thereon by the sputtering is wound around the reel 405 with the protective tape 409*b*.

The sputtering apparatus used in the present invention is not limited to the mode described in this embodiment.

EMBODIMENT 2

One mode of a method for forming a protective film with resin on a surface of a fiber after forming a semiconductor element, a wiring, or the like is described in this embodiment.

Figure 5A:
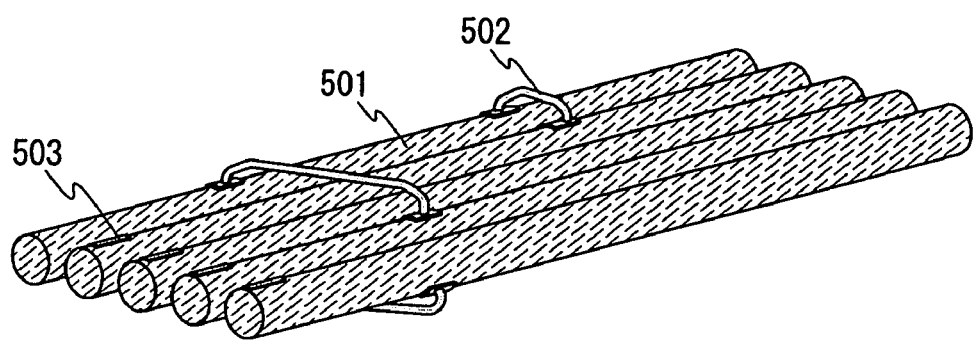
FIGS. 5A and 5B show fibers electrically connected with a wiring and a state in which the fibers are covered with resin.

FIG. 5A shows a state of a plurality of fibers 501 on which an integrated circuit is formed. In FIG. 5A, the plurality of the fibers 501 are disposed so that longitudinal directions thereof are in the same direction; however, a direction of arranging the fibers 501 and the number of the fibers 501 are not limited to the mode shown in FIG. 5A. In FIG. 5A, the fibers 501 are connected electrically by a wiring 502. Signals or power supply voltages may be transmitted and received between the fibers 501 by means of not only the wiring but also optical transmission. Therefore, in this specification, the connection includes a connection that can transmit and receive signals by optical signals as well as the electrical connection.

In FIG. 5A, reference numeral 503 denotes a terminal that can be connected with an integrated circuit electrically. The terminal 503 is provided at an edge portion of the fiber 501 in FIG. 5A, but the present invention is not limited thereto. A position for providing the terminal can be set freely by a designer. A light-emitting device or a photodetector in place of the terminal may be provided to connect to the exterior by the optical transmission.

Figure 5B:
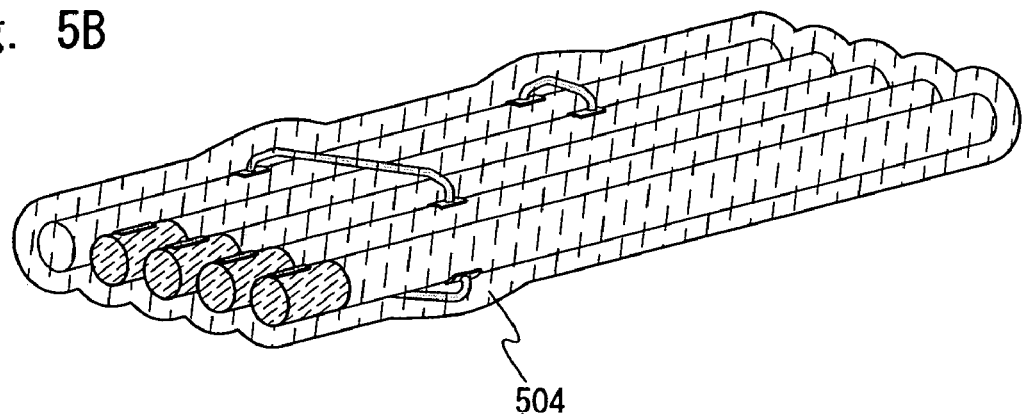

As shown in FIG. 5B, the fiber 501 shown in FIG. 5A is covered with the resin 504. In the case of using the terminal for a connection with the exterior as shown in FIG. 5B, the terminal 503 is exposed without being covered with the resin 504. In the case of using the optical transmission for the connection with the exterior or connection between the fibers 501, a path of the optical signal can be secured at least by using transparent resin for a portion to be the path or by not covering the portion with resin.

Polyethylene of thermally polymerized type is used for the resin 504 in this embodiment. After applying the resin 504, the applied resin 504 is cured by a halogen lamp. In this embodiment, a halogen lamp, an infrared lamp, a metal halide lamp, a xenon arc lamp, a carbon arc lamp, a high-pressure sodium lamp, or a high-pressure mercury lamp can be used to cure the applied resin. A heater and the like as well as the lamp may be used to heat the resin. In the case of ultraviolet curing resin in place of heat curing resin, the resin may be cured by being irradiated with ultraviolet rays. Resin such as epoxy resin, acrylate resin, silicone resin, or other known resin can be used for the resin 504.

Figure 8:
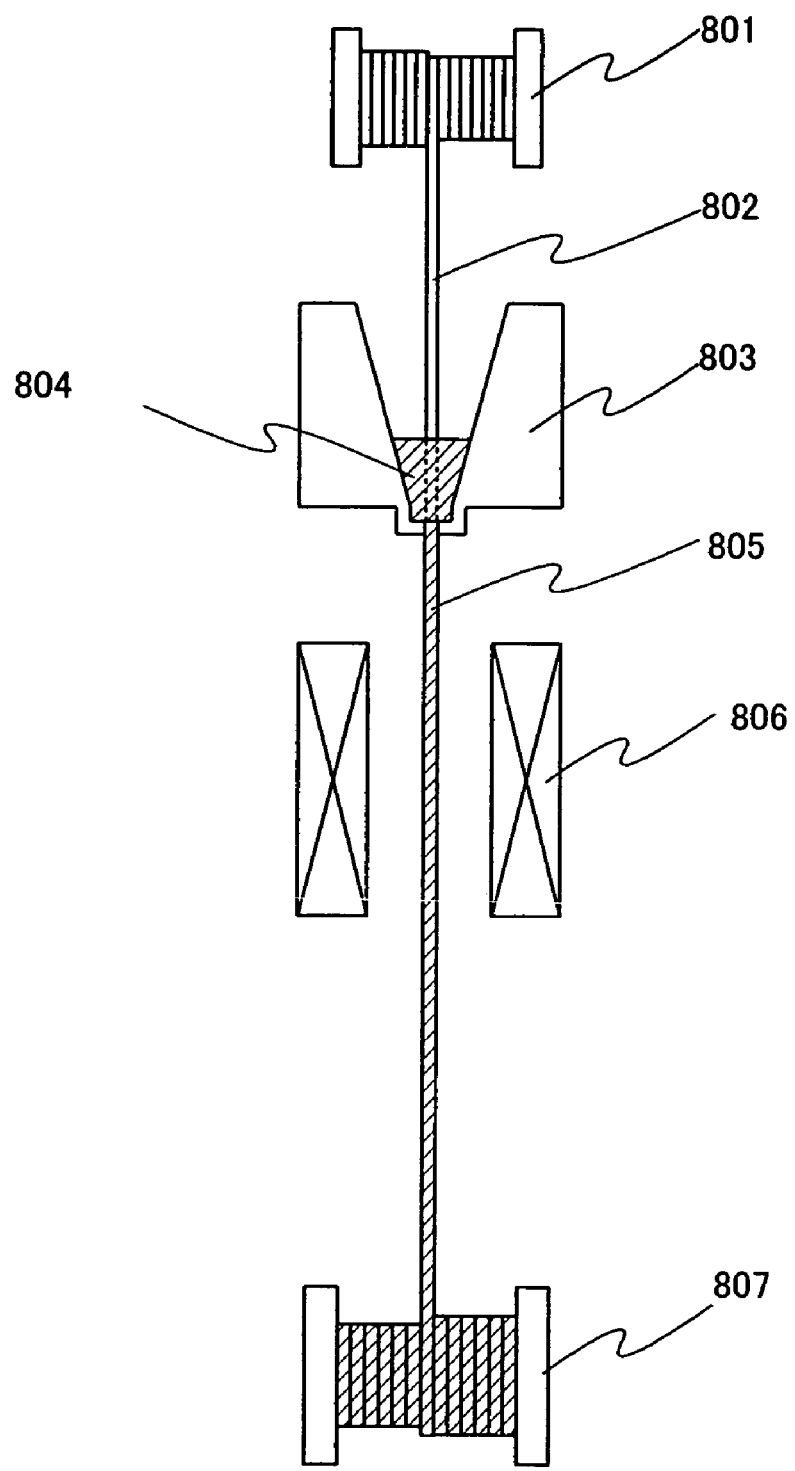
FIG. 8 shows a structure of an apparatus for an application of a protective film.

FIG. 8 shows a structure of an apparatus for applying the resin to the fiber. Reference numeral 801 denotes a reel around which a fiber 802 with no resin applied thereto is wound. Reference numeral 803 denotes a tank for resin, which contains resin 804 used for application. The tank 803 is provided with an opening portion through which the fiber passes, and the fiber passes through the opening portion, so that the resin 804 contained in the tank 803 is applied to the fiber.

As for a fiber 805 with the resin applied thereto, the applied resin is cured by being heat-treated by a heater 806. A means for performing the heat treatment such as a heater and a lamp is used for the type of resin cured by the heat treatment; however, the present invention is not limited thereto. A means that is capable of performing appropriate treatment for a curing condition of the resin is provided. For example, in the case of the resin cured by the irradiation of ultraviolet rays, a lamp that is capable of irradiating with the ultraviolet rays is provided in place of the heater 806.

After the resin is cured, the fiber 805 is wound around a reel 807. The reels 801 and 807 are rotated in synchronization with each other. Speed at applying the resin to the fiber can be controlled by rotational speed of the reels 801 and 807. Although not shown in FIG. 8, a reel for the protective tape may be provided. In that case, the protective tape may be wound around the reel 801 along with the fiber 802, and the fiber 805 with the resin applied thereto may be wound around the reel 807 with the protective tape.

As described in this embodiment, the plurality of the fibers 501 can be fixed to some extent by sealing the plurality of the fibers 501 forming the integrated circuit with the resin 504. Therefore, with securing flexibility of the fiber 501 itself, a defect in connection between the fibers performed by the wire, the optical transmission, and the like can be reduced, and mechanical strength thereof can be enhanced.

EMBODIMENT 3

In this embodiment, one embodiment of a method for manufacturing a semiconductor element formed on a surface of a fiber is described.

Figure 6A:
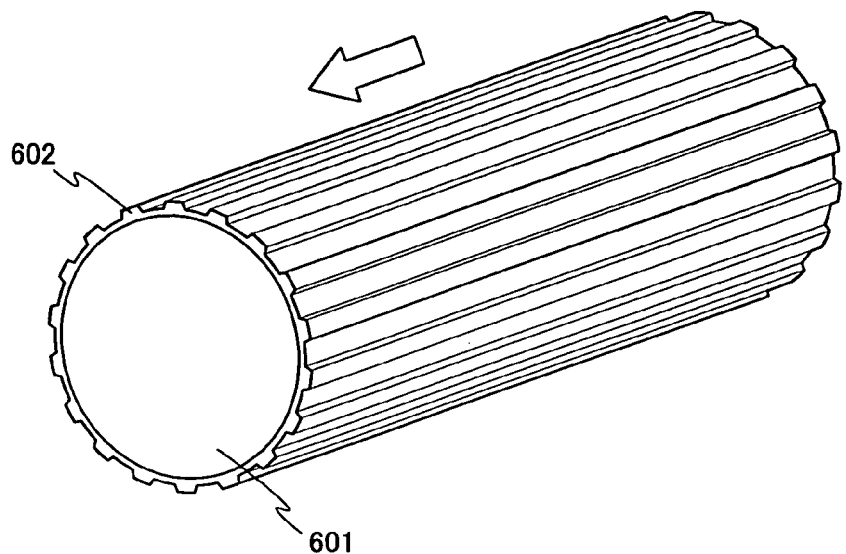
FIGS. 6A to 6E show a method for manufacturing an island semiconductor film with the use of an insulating film having convexo-concave (i.e. protrusions and recessions)

FIG. 6A shows a state of a fiber 601 and an insulating film 602 having convexo-concave formed on a surface of the fiber 601. As shown in FIG. 6A, the insulating film 602 has convexo-concave in a stripe or a rectangular shape. A longitudinal direction of the convexo-concave corresponds to a longitudinal direction of the fiber 601 indicated by an outline arrow. A semiconductor film is formed on the surface of the insulating film 602 of the above-described mode.

Figure 6B:
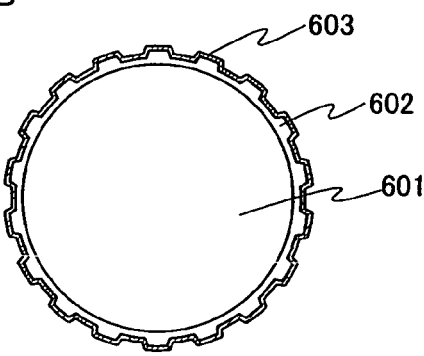

FIG. 6B corresponds to a cross-sectional view of the fiber 601 over which a semiconductor film 603 is formed. The semiconductor film 603 is formed on both a concave portion and a convex portion of the insulating film 602.

Subsequently, the semiconductor film is crystallized by being irradiated with laser light of continuous wave. A known gas laser or solid-state laser of the continuous wave can be used for a laser used to oscillate the laser light. As the gas laser, an Ar laser, a Kr laser, and the like are cited. As the solid-state laser, a YAG laser, a $YVO_4$ laser, a YLF laser, a $YAlO_3$ laser, a $Y_2O_3$ laser, a glass laser, a ruby laser, an alexandrite laser, a Ti:sapphire laser, and the like are cited. A harmonic to a fundamental wave can be obtained by using a non-linear optical element.

Crystals having a large grain size can be obtained by applying a laser light of second to fourth harmonics of a fundamental wave with a solid-state laser that is capable of continuously oscillating. Typically, second harmonic (wavelength: 532 nm) or third harmonic (wavelength: 355 nm) of Nd:$YVO_4$ laser (fundamental wave, wavelength: 1064 nm) is preferably adopted. Specifically, laser light emitted from the continuous wave type $YVO_4$ laser with 10 W output is converted into the harmonic by using the non-linear optical element. In addition, a method for emitting the harmonic by applying crystal of $YVO_4$ and the non-linear optical elements into a resonator can be adopted.

Figure 6C:
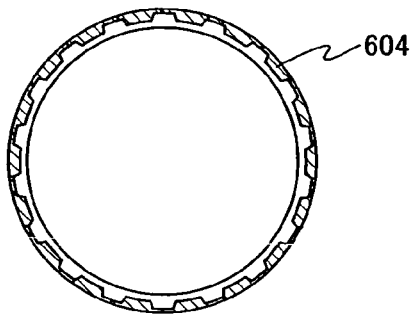

Scanning with the laser light is performed in the direction of the outline arrow shown in FIG. 6A. At the time of the laser light irradiation, the fiber 601 is rotated, using a parallel axis to the longitudinal direction of the fiber as a rotational axis. The closer the rotational axis is to a center of the fiber 601, the more uniformly the laser light can be irradiated. As for a semiconductor film temporarily melted by the irradiation of the laser light, volume thereof moves from the convex portion into the concave portion by surface tension. Therefore, as shown in FIG. 6C, as for a crystallized semiconductor film 604, the film thickness of a portion overlapped with a convex portion is thinned, and the surface is flattened. Grain boundaries tend to be generated in a thin portion overlapped with the convex portion, and a highly crystalline film with few grain boundaries compared to the convex portion is formed in the concave portion.

Figure 6D:
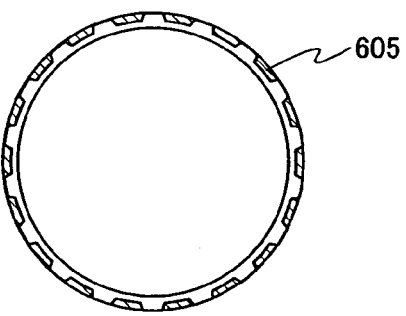
Figure 6E:
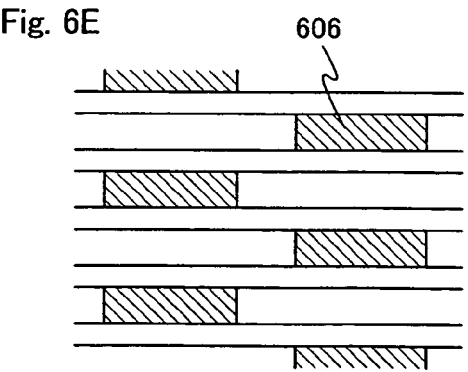

The portion overlapped with the convex portion of the semiconductor film 604 is removed by etching the surface of the crystallized semiconductor film 604 (FIG. 6D). According to the above steps, the convex portion is exposed and a highly crystalline semiconductor film 605 existing only in the concave portion can be formed. In some cases, depending on a relationship between the film thickness of the semiconductor film to be formed and the depth of convexoconcave, the semiconductor film remains only in the concave portion without etching after crystallizing. In this case, the surface of the crystallized semiconductor film is not required to be etched again.

The width between the convex portions in a perpendicular direction to a longitudinal direction is preferably set to from 0.01 μm to 2 μm, more preferably approximately from 0.1 μm to 1 μm. The height of the convex portion is preferably set to from 0.01 μm to 3 μm, more preferably from 0.1 μm to 2 μm.

An island semiconductor film 606 is formed in the concave portion by patterning the semiconductor film 605 shown in FIG. 6D. A semiconductor element can be formed over the fiber 601 by using the island semiconductor film 606. Thus, as for, for example, a TFT, mobility and an ON current can be enhanced by using the highly crystalline semiconductor film existing in the concave portion.

In this embodiment, the semiconductor film 605 existing only in the concave portion is formed by etching the entire surface of the crystallized semiconductor film 604; however, the present invention is not limited thereto. The island semiconductor film may be formed by patterning the surface directly without etching or may be formed by patterning after etching the surface partially. After crystallizing, the convex portion of the insulating film 602 may be etched.

EMBODIMENT 4

In this embodiment, one embodiment of the present invention using an optical fiber as the fiber and performing optical transmission by using the optical fiber is described.

Figure 7:
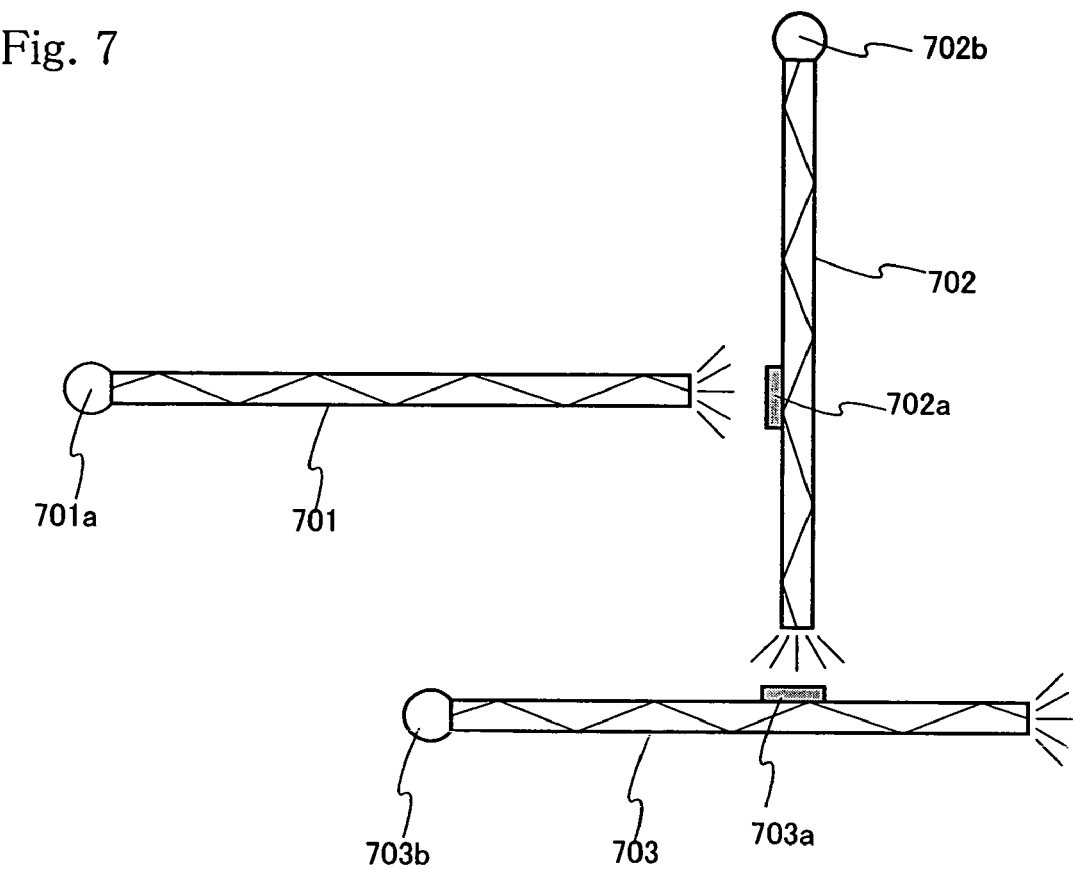
FIG. 7 shows a semiconductor device with the use of an optical fiber.

FIG. 7 shows a state in which three optical fibers on which integrated circuits are formed are disposed. The number of the optical fiber is not limited thereto, and all of the fibers on which the integrated circuits are formed are not necessarily required to be the optical fiber. In FIG. 7, signals or power supply voltages outputted from the integrated circuit formed on the surface of the optical fiber 701 are converted to an optical signal by a light-emitting device 701a provided for the optical fiber 701. The optical signal is transmitted to other optical fibers (here, an optical fiber 702) by the optical fiber 701.

The optical fiber 702 is provided with a photodetector 702a, and the optical signal transmitted from the optical fiber 701 is converted into electronic signals or power supply voltages by the photodetector 702a and is supplied to the integrated circuit formed on the surface of the optical fiber 702. Signals or power supply voltages outputted from the integrated circuit formed on the optical fiber 702 are similarly converted into the optical signal by a light-emitting device 702b provided for the optical fiber 702, and are transmitted through the optical fiber 702 to an optical fiber 703.

The optical fiber 703 is provided with a photodetector 703a and a light-emitting device 703b, and the optical signal is processed as similarly as in the case of the optical fiber 702.

In this embodiment, the optical signal is transmitted from one optical fiber to another optical fiber. However, the optical signal may be transmitted from one optical fiber to a plurality of optical fibers, or conversely from a plurality of optical fibers to one optical fiber. According to the above-described structure, an optical bus with large capacity can be formed.

In FIG. 7, the optical fibers are disposed to be straight; however, the present invention is not limited thereto. As for the optical fiber, transmission loss is extremely little typically, and some are equal to or less than 1 db/km. Therefore, the optical signal can be transmitted with the fiber bent to some extent. Compared to other fibers, freedom of a layout of the optical fiber itself is not limited due to the optical fiber.

In this embodiment, the case of performing the optical transmission by using the optical fiber is described; however, the present invention is not limited thereto. If a layout of the light-emitting device and the photodetector to be disposed on the fiber is designed so that the optical signal is transmitted and received certainly between the fibers, the optical transmission can be performed between fibers of any materials. Note that light directivity and certainty of transmission of the optical fiber can be enhanced with the use of the optical fiber.

In this embodiment, an example where the light-emitting device or the photodetector provided separately is connected electrically to the integrated circuit of each fiber is described; however, the present invention is not limited thereto. For example, the light-emitting device or the photodetector may be formed on the fiber together with the integrated circuit.

As described in the Embodiment 2, the fibers may be sealed with resin to be fixed. The signals or the power supply voltages may be transmitted and received by the optical transmission in the same fiber.

What is claimed is:

1. A semiconductor device comprising:
   a linear support; and
   at least a first semiconductor element and a second semiconductor element which are formed on the linear support,
   wherein a line connecting the first semiconductor element and the second semiconductor element passes through an inside of the linear support.

2. The semiconductor device according to claim 1 wherein the first and second semiconductor elements are covered by a resin.

3. The semiconductor device according to claim 1 wherein the linear support is an optical fiber.

4. A semiconductor device comprising:
   at least a first linear support and a second linear support;
   a first semiconductor element formed on the first linear support; and
   a second semiconductor element formed on the second linear support,
   wherein the first semiconductor element is connected with the second semiconductor element through a wiring.

5. The semiconductor device according to claim 4 wherein each of the first and second semiconductor elements is covered by a resin.

6. A semiconductor device comprising:
   at least a first linear support and a second linear support;
   a first semiconductor element formed on the first linear support; and
   a second semiconductor element formed on the second linear support,
   wherein each of the first linear support and the second linear support is an optical fiber.

7. A semiconductor device comprising:
   at least a first linear support and a second linear support;
   a first semiconductor element formed over the first linear support;
   a second semiconductor element formed over the second linear support,
   wherein the first semiconductor element is connected with the second semiconductor element through an optical transmission.

8. The semiconductor device according to claim 7 wherein each of the first and second semiconductor elements is covered by a resin.

9. The semiconductor device according to claim 7 wherein each of the first linear support and the second linear support is an optical fiber.

10. A semiconductor device comprising:
    a linear support; and
    a semiconductor element formed over the linear support, said semiconductor element comprising an island semiconductor film,
    wherein the island semiconductor film is formed by crystallization using a laser light irradiation.

11. The semiconductor device according to claim 10 wherein the semiconductor element is covered by a resin.

12. The semiconductor device according to claim 10 wherein the linear support is an optical fiber.

13. A method for manufacturing a semiconductor device, comprising the steps of:
    forming an insulating film over a linear support;
    forming a semiconductor film so as to be in contact with the insulating film; and
    forming a semiconductor element using the semiconductor film, wherein the step of forming the insulating film is performed while the linear support is rotating, using a rotational axis parallel to a longitudinal direction of the linear support as a center.

14. A method for manufacturing a semiconductor device, comprising the steps of:
    forming an insulating film over a linear support;
    forming a semiconductor film so as to be in contact with the insulating film; and
    forming a semiconductor element using the semiconductor film, wherein the step of forming the semiconductor film is performed while the linear support is rotating, using a rotational axis parallel to a longitudinal direction of the linear support as a center.

15. The method according to claim 13 further comprising a step of covering the semiconductor element with a resin.

16. The method according to claim 14 further comprising a step of covering the semiconductor element with a resin.

17. The method according to claim 13 wherein the linear support is an optical fiber.

18. The method according to claim 14 wherein the linear support is an optical fiber.

19. A method for manufacturing a semiconductor device, comprising the steps of:
    forming an insulating film over a linear support;
    forming a semiconductor film so as to be in contact with the insulating film;
    increasing crystallinity of the semiconductor film by a laser light irradiation; and
    forming a semiconductor element using the semiconductor film having the increased crystallinity,
    wherein the step of forming the insulating film and the irradiation of the laser light are performed while the linear support is rotating, using a rotational axis parallel to a longitudinal direction of the linear support as a center.

20. A method for manufacturing a semiconductor device, comprising the steps of:
    forming an insulating film over a linear support;
    forming a semiconductor film so as to be in contact with the insulating film;
    increasing crystallinity of the semiconductor film by a laser light irradiation; and
    forming a semiconductor element using the semiconductor film having the increased crystallinity,
    wherein the step of forming the semiconductor film and the irradiation of the laser light are performed while the linear support is rotating, using a rotational axis parallel to a longitudinal direction of the linear support as a center.

21. The method according to claim 19 further comprising a step of covering the semiconductor element with a resin.

22. The method according to claim 20 further comprising a step of covering the semiconductor element with a resin.

23. The method according to claim 19 wherein the linear support is an optical fiber.

24. The method according to claim 20 wherein the linear support is an optical fiber.

25. The semiconductor device according to claim 1, wherein an insulating film is formed between the linear support and the first and second semiconductor elements.

26. The semiconductor device according to claim 1, wherein a cross-section of the linear support is a circle or an ellipse.

27. The semiconductor device according to claim 4, wherein insulating films are formed between the first and second semiconductor elements and the first and second linear supports, respectively.

28. The semiconductor device according to claim 4, wherein the first linear support and the second linear support are aligned in parallel with each other.

29. The semiconductor device according to claim 4, wherein each of cross-sections of the first and second linear supports is a circle or an ellipse.

30. The semiconductor device according to claim 6, wherein each of the first and second semiconductor elements is covered by a resin.

31. The semiconductor device according to claim 6, wherein insulating films are formed between the first and second semiconductor elements and the first and second linear supports, respectively.

32. The semiconductor device according to claim 6, wherein the first linear support and the second linear support are aligned in parallel with each other.

33. The semiconductor device according to claim 6, wherein each of cross-sections of the first and second linear supports is a circle or an ellipse.

34. The semiconductor device according to claim 1, wherein the linear support is a fiber.

35. The semiconductor device according to claim 4, wherein each of the first and second linear supports is a fiber.

36. The semiconductor device according to claim 6, wherein each of the first and second linear supports is a fiber.

* * * * *